May 2, 1944.   P. H. WASHAM, JR   2,347,651
MEANS FOR COOLING ROLLING MILL ROLLS AND THE LIKE
Filed Dec. 3, 1942   2 Sheets-Sheet 1

INVENTOR
PATRICK HENRY WASHAM, JR.,
by: John E. Jackson
his Attorney.

May 2, 1944.      P. H. WASHAM, JR      2,347,651
MEANS FOR COOLING ROLLING MILL ROLLS AND THE LIKE
Filed Dec. 3, 1942      2 Sheets-Sheet 2

INVENTOR
PATRICK HENRY WASHAM, JR.,
by: John E. Jackson
his Attorney.

Patented May 2, 1944

2,347,651

UNITED STATES PATENT OFFICE 2,347,651

MEANS FOR COOLING ROLLING MILL ROLLS AND THE LIKE

Patrick Henry Washam, Jr., Pittsburgh, Pa.

Application December 3, 1942, Serial No. 467,819

8 Claims. (Cl. 80—41)

This invention relates to rolling mills and, particularly, to an improved connecting means for supplying a fluid, especially a cooling fluid, into the rolls thereof.

In the steel industry it is common practice to cool the work rolls of rolling mills by introducing a cooling fluid such as water into the bore of the rolls. The water or fluid is delivered into the roll usually through a rotary union and delivery pipe which are connected to the end of the roll opposite that from the drive coupling. The water or fluid flows generally through a delivery pipe into the bore of the roll and back around the outside delivery pipe and out the same end of the roll through a suitable connection in the rotary union.

Heretofore, the union and pipe connections to the roll were usually held in place in the end thereof solely by means of a threaded bushing which screwed into a tapped hole in the end of the roll. Such a connection means for various reasons was unsatisfactory. One reason was that it is difficult and tedious to tighten the threaded bushing and joint sufficiently when the roll is assembled in the mill so as to prevent unscrewing and consequent loosening of the same therein as the mill is rapidly accelerated or decelerated. Such unscrewing and loosening of the threaded bushing and the connection associated therewith not only permitted escapement and leakage of the cooling fluid but also presented a safety hazard, in that, at times the union and pipe were thrown from their position in the end of the roll thereby injuring the mill operator or other workmen in the vicinity thereof. Also, much time was lost during the changing of the rolls in disconnecting and connecting the threaded joint and pipe in the end of the rolls. Furthermore, such continual removing and replacing of the threaded connection soon wore down the threads and oftentimes the threads were damaged which not only necessitated rethreading and the replacement of parts but resulted in leakage of the cooling fluid from within the bore of the roll around the threaded connection.

Accordingly, it is one of the objects of the present invention to provide an improved connecting means for supplying a fluid into the interior of rolling mill rolls and the like which is securely attached to the end of the roll and will not accidentally escape from its position thereon during the operation of the mill thereby providing a fluid supplying connecting means which is safe in its use.

It is another object of the invention to provide an improved connecting means for supplying a fluid into the interior of rolling mill rolls and the like which is simple and inexpensive in its construction and, at the same time a fluid supplying means which can be easily and quickly attached to the end of the roll and removed therefrom.

It is a further object of this invention to provide an improved connecting means for supplying a fluid into the interior of rolling mill rolls and the like which is yieldable, yet a means which is strong and rugged in its construction and, at the same time, a fluid supplying connecting means which effectively seals the end of the roll against leakage of the fluid from within the bore thereof.

It is a more specific object of the present invention to provide an improved connecting means for supplying a fluid into the interior of rolling mill rolls and the like which in one position is securely locked in position in the end of the roll and in another position may be easily and conveniently removed from its position therein.

Various other objects and advantages of this invention will be more apparent in the course of the following specification and will be particularly pointed out in the appended claims.

In the accompanying drawings there is shown, for the purpose of illustration, an embodiment which my invention may assume in practice.

Figure 1:
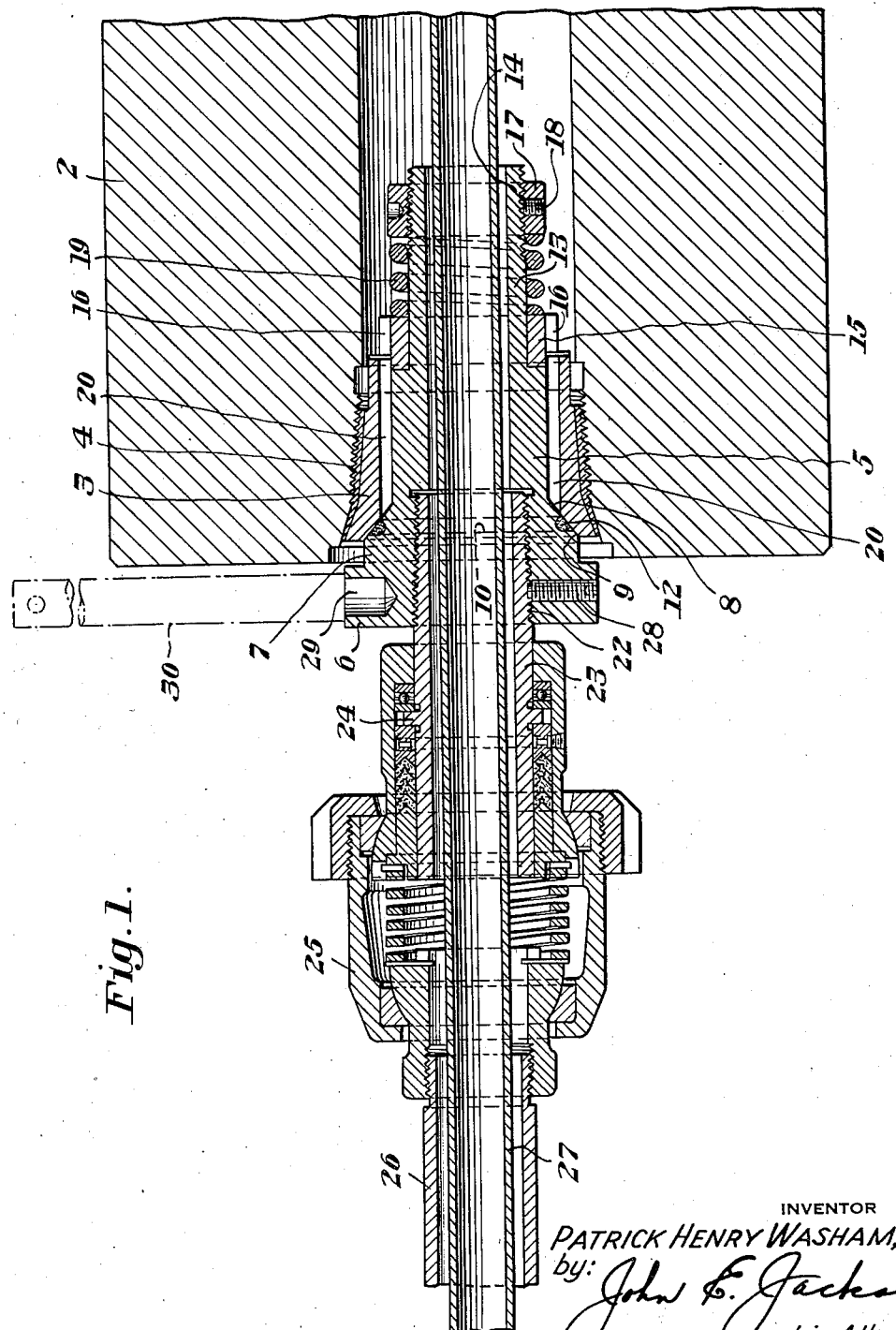
Figure 1 is a longitudinal sectional view through the improved connecting means of my invention showing it incorporated with the end of the roll of a rolling mill.

Referring more particularly to the drawings, the improved connecting means of my invention is shown incorporated with the end of a rolling mill roll 2, as shown in Figure 1 of the drawings. There is arranged in the end of the roll neck a tubular coupling or plug 3 which is exteriorly threaded as at 4 with such threaded portion adapted to cooperate with an interiorly threaded portion arranged in the roll neck adjacent the outer end of the bore therein.

Figure 2:
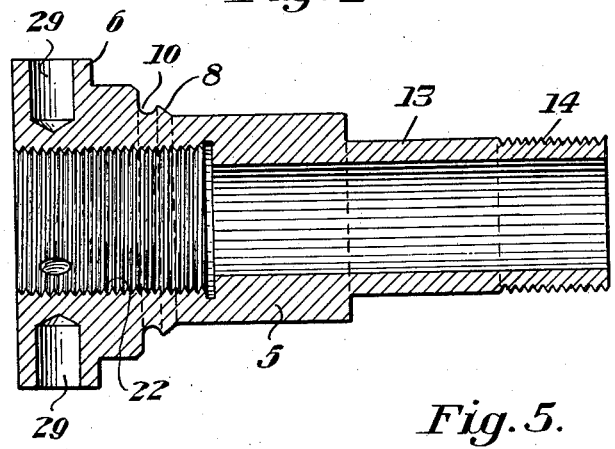
Figure 2 is a similar sectional view through the bushing-like member of my improved connecting means showing the same more in detail.
Figure 3:
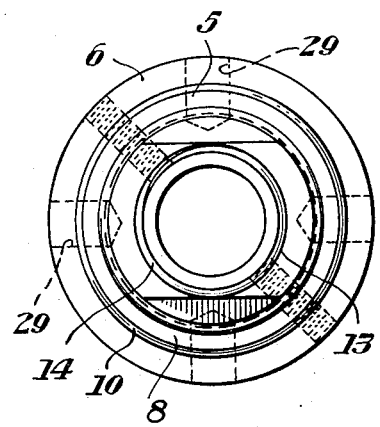
Figure 3 is an end view of the bushing-like member as shown in Figure 2.

According to the present invention, there is arranged within the coupling member 3 a bushing-like member 5, as shown in Figures 2 and 3 of the drawings, which extends through the coupling and into the bore of the roll. On the outer end of the bushing-like member 5 there is arranged, preferably a flange portion 6 and on the inner side thereof, there is disposed, preferably an enlarged portion 7 having a tapered portion 8 carried thereby which is adapted to cooperate with a similar interiorly tapered portion 9 arranged on the inner periphery of the coupling 3 at the outer end thereof. There is preferably arranged in the tapered portion 8 of the bushing-like member 5, a circumferential groove 10 in which there is disposed a sealing ring or gasket member 12 which is adapted to cooperate with the tapered portion 9 of the coupling 3 to seal the space between the tapered portions 8 and 9 so as to prevent leakage of the fluid from within the bore of the roll in a manner hereinafter to be described.

Figure 7:
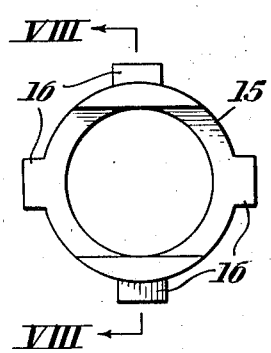
Figure 7 is an elevational view of the outer end of the annular member of my connecting means which is adapted to be disposed on the end of the bushing-like member.
Figure 8:
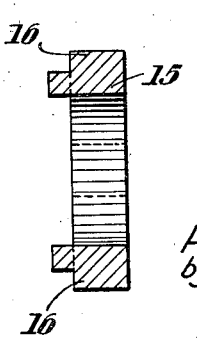
Figure 8 is a sectional view taken on line VIII—VIII of Figure 7.

On the inner end of the bushing-like member 5, there is disposed a reduced diameter portion 13 having an exteriorly threaded portion 14 arranged on the extreme inner end thereof. There is mounted loosely on the reduced end portion 13 for movement axially thereof, an annular latch pawl member 15, as shown in Figures 7 and 8, having a plurality of radially extending projecting portions 16 carried thereby, namely, four in the present instance, which are arranged preferably at an angle of 90 degrees to each other. On the threaded portion 14 of the reduced portion 13 there is mounted a nut-like member 17 preferably having set screw 18 arranged therein for locking the same in any desired position thereon. There is also disposed around the reduced diameter portion 13, preferably a compression coil spring 19 which is disposed between the nut-like member 17 and the annular member 15 with the opposed ends of the spring adapted to abut these members for a purpose hereinafter to be described.

Figure 4:
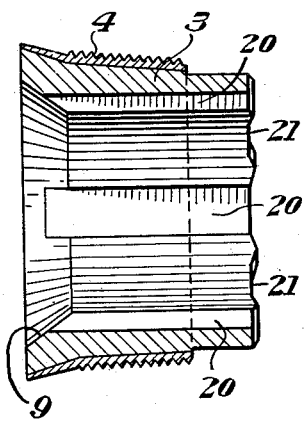
Figure 4 is a longitudinal sectional view of the coupling member of the connecting means of my invention.
Figure 5:
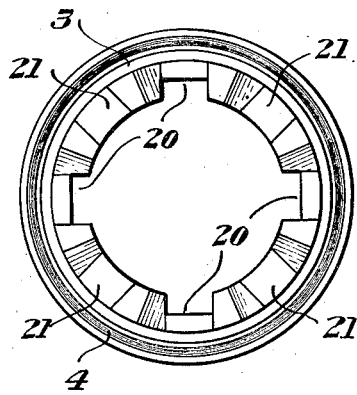
Figure 5 is an elevational view of the inner end of the coupling member as shown in Figure 4.
Figure 6:
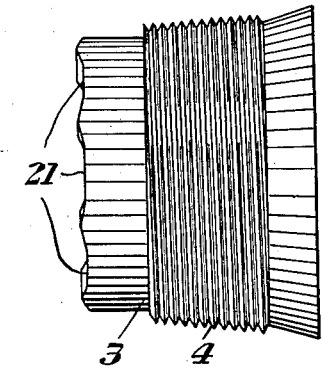
Figure 6 is a side view of the coupling as shown in Figure 5.

On the inner periphery of the coupling or plug member 3, as more clearly shown in Figures 4 and 5, there are arranged a plurality of axially extending slots 20 with the number thereof being similar in number to the number of radially extending projecting portions 16 carried by the annular member 15 and with which they are adapted to cooperate. On the inner end of the coupling or plug member 3, there are arranged between the ends of the slots 20 and preferably at an angle of 45 degrees therewith a plurality of indentations 21 which are also similar in number to the number radially extending projecting portions 16 and with which such projecting portions in one position are adapted to cooperate.

The bushing-like member 5 is preferably interiorly threaded as at 22 at the outer end thereof for receiving a connecting nipple-like member 23. There is carried by nipple 23 intermediate the length thereof, preferably a circumferential flange 24. There is disposed on an outer end of the nipple 23, a conventional type rotary union 25 which cooperates with the flange 24 to securely hold the rotary union on the end of the nipple. The rotary union 25 is connected preferably to a hose connection 26 which in turn is connected to a suitable source of fluid supply (not shown). Within the rotary union 25, the nipple-like member 23, and the bushing-like member 25 there is disposed, a longitudinally extending fluid conveying pipe 27 which extends preferably into the bore of the roll and terminates at a spaced distance from the opposed end thereof in a manner well known to those skilled in the art.

The improved connecting means of my invention is assembled and maintained in the bore of the roll in the following manner:

The nut-like member 17 on the end of the bushing-like member 5 is adjusted on the threaded portion 14 thereof so that the coil spring 19 has the desired compressive force against the annular member 15. The set screw 18 in the nut-like member 17 is then tightened so as to maintain the nut-like member in such adjusted position. The coupling member or plug 3 is then screwed tightly into the end of the roll 2. After the plug 3 has been positioned in the roll, the bushing-like member 5 together with the annular member 15 carried thereby is then inserted into and through the coupling or plug. In order for the annular member to pass through the plug, it will be seen that the radially extending projecting portions 16 carried thereby necessarily having to be disposed so that they mesh with and pass through the slots 20 carried by the plug 3. The bushing-like member 5 is moved into the plug 3 until the tapered portions 8 and 9 abut each other and prevent further movement of the bushing-like member thereinto. In such position it will be seen that the annular member 15 carried by the bushing-like member 5 is disposed adjacent the inner end of the coupling or plug 3. After the bushing-like member and the annular member 15 carried thereby has reached such position, the bushing-like member 5 together with the annular member 15 carried thereby is rotated through an angle of 45 degrees. Upon such rotation it will be seen that the radially extending portions 16 of the annular member will move out of alignment with the slots 20 and ride over the end of the coupling or plug 3 and finally be disposed in the indentations 21 arranged on the inner end of the end of the coupling 3. It will be seen that the annular member 15 moves inwardly over the reduced portion 13 of the bushing-like member 5 against the action of the spring 19 when the radially extending portions 16 ride over the end of the coupling 3. When the projecting portions 16 are disposed opposite the indentations 21, it will be seen that the annular member 15 is forced outwardly due to the action of the spring 19 positioning the portions 16 in the indentations 21 thereby preventing unintentional rotated movement of the bushing-like member 5.

After the bushing-like member 5 has been rotated and the projecting portions 16 of the annular member 15 are properly set and locked in position in the indentations 21 on the inner end of the plug 3, it will be seen that the tapered portions 8 and 9 of the plug 3 and bushing-like member 5, respectively, are forced together and that the rubber ring member 12 is forced tightly against the tapered portion 8 so as to prevent leakage of the fluid from the bore of the roll between the plug 3 and the bushing-like member 5. If it is desired to remove the connecting means of my invention from its position in the end of the roll, the reverse of the above procedure is followed.

In the flange portion 6 of the bushing-like member 5, there is arranged preferably a set screw 28 for locking the bushing-like member against rotative movement relative to the connecting bushing 23. There are also preferably arranged in the periphery of the flange portion 6 a plurality of holes 29 in which there is adapted to be inserted a lever like tool member 30 for the purpose of rotating the bushing-like member 5.

As a result of my invention, it will be seen that there is provided a means for attaching a fluid supplying connection to the end of a rolling mill roll or the like which is securely attached to the end of the roll during the use thereof and, at the same time, a connection which may be conveniently and quickly removed from its position in the end of the roll or assembled therein. It will also be seen that if the connecting means of the present invention is subject to any undue force or blows from the side or top thereof, it will yield to a certain extent and the connection will not be broken, due to the action of the coil spring 19. If the connection tends to be forced from its position in the roll plug 3, it will be seen that the coil spring 19 will tend to urge it back into position therein.

While I have shown and described one specific embodiment of my invention, it will be understood that this embodiment is merely for the purpose of illustration and description and that various other forms may be devised within the scope of my invention, as defined in the appended claims.

I claim:

1. Connecting means for supplying a fluid into an interiorly bored rolling mill roll and the like comprising a coupling member adapted to be connected with the roll bore at one end thereof, a removable bushing-like member telescopically arranged within said coupling member and adapted to extend into the bore of the roll, an annular member arranged on the inner end of said bushing-like member for slidable movement longitudinally thereof and secured against rotative movement relative thereto, said annular member having a plurality of radially extending projecting portions arranged around the periphery thereof which cooperate in one position with the inner end of said coupling to lock the bushing-like member therein, said coupling member having a plurality of axially extending slots arranged on the inner periphery thereof similar in number to the number of said radially extending projecting portions carried by said annular member and with which they are adapted to cooperate when said bushing-like member is inserted into and through said coupling, said projecting portions adapted to cooperate with the inner end of said coupling to lock said bushing-like member therein upon rotatable movement of said bushing-like member, resilient means arranged on the inner end of said bushing-like member for maintaining said annular member in yieldable engagement with the inner end of said coupling, and means arranged on the outer end of said bushing-like member for connecting the same to a source of fluid supply.

2. Connecting means for supplying a fluid into an interiorly bored rolling mill roll and the like comprising a coupling member adapted to be connected with the roll bore at one end thereof, a removable bushing-like member telescopically arranged within said coupling and adapted to extend into the bore of the roll, means arranged on the outer end of said bushing-like member which cooperates with the outer end of said coupling member so as to limit the movement of said bushing-like member into said coupling member and the roll, and annular member arranged on the inner end of said bushing-like member for slidable movement longitudinally thereof and secured against rotative movement relative thereof, a plurality of radially extending portions arranged around the periphery of said annular member which are adapted to abut against the inner end of said bushing-like member to lock the coupling member in position therein, a coil spring arranged around the inner end of said bushing-like member beyond said annular member, and an adjustable nut arranged on the inner end of said bushing-like member beyond said spring with the same positioned between said nut and said annular member and bearing thereagainst, said spring adapted to hold said annular member in locking engagement with the inner end of said coupling member, said bushing-like member together with the annular member carried thereby adapted to be inserted into said coupling and rotated therein whereby the projecting portions of said annular member cooperate with the inner end of said coupling after such rotative movement of said bushing-like member so as to lock yieldably the same in position in said coupling and the end of the roll.

3. Connecting means for supplying a fluid into an interiorly bored rolling mill roll and the like comprising a coupling member adapted to be connected with the roll bore at the end thereof, a bushing-like member arranged within said coupling and adapted to extend into the bore of the roll, an enlarged portion arranged in the outer end of said bushing-like member which cooperates with the outer end of the said coupling member so as to limit the movement of said bushing-like member into said coupling member, said bushing-like member having a reduced diameter portion arranged on the inner end thereof, an annular member arranged on the reduced portion of said bushing-like member for limited movement relative thereto in an axial direction, said annular member having a plurality of radially extending projecting portions carried thereby which are adapted to cooperate in one position with the inner end of said coupling member, said coupling member having a plurality of axially extending slots arranged on inner periphery thereof similar in number to the number of said radially extending projecting portions carried by said annular member and with which they are adapted to cooperate, said bushing-like member together with the annular member adapted to be inserted into said coupling and rotated therein whereby the projecting portions of said annular member cooperate with the inner end of said coupling after such rotative movement of said bushing-like member to lock the same in position in said coupling, resilient means carried by the reduced portion of said bushing-like member for maintaining yieldably said annular member in said locked position, and means arranged on the outer end of said bushing-like member for connecting the same to a source of fluid supply.

4. Connecting means for supplying a fluid into an interiorly bored rolling mill roll and the like, as defined in claim 3, including means arranged between the enlarged outer portion carried by the bushing-like member and the outer end of the coupling with which it cooperates for sealing the space therebetween so as to prevent leakage of the fluid from the interior of the roll.

5. Connecting means for supplying a fluid into an interiorly bored rolling mill roll and the like, as defined in claim 3, wherein the resilient means carried by the reduced portion of the bushing-like member for maintaining yieldably the annular member in locked position against the inner end of the coupling member consists of a coil spring arranged around the reduced portion.

6. Connecting means for supplying a fluid into an interiorly bored rolling mill roll and the like, as defined in claim 3, including means carried by the outer end of the bushing-like member for rotating the same in the coupling member.

7. Connecting means for supplying a fluid into an interiorly bored rolling mill roll and the like, as defined in claim 3, wherein the enlarged portion arranged on the outer end of the bushing-like member which cooperates with the outer end of the coupling member so as to limit the movement of the bushing-like member into the coupling member consists of a tapered portion carried by said bushing which cooperates with a similar tapered portion carried by said coupling member.

8. Connecting means for supplying a fluid into an interiorly bored rolling mill roll, as defined in claim 3, including means arranged on the inner end of the coupling member with which the radially extending projecting portions carried by the annular member cooperate to lock the bushing-like member in position in the coupling member.

PATRICK HENRY WASHAM, Jr.